United States Patent
Ghosh et al.

(10) Patent No.: US 7,236,548 B2
(45) Date of Patent: Jun. 26, 2007

(54) BIT LEVEL DIVERSITY COMBINING FOR COFDM SYSTEM

(75) Inventors: Monisha Ghosh, Chappaqua, NY (US); Joseph Patrick Meehan, New York City, NY (US); Xuemei Ouyang, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 878 days.

(21) Appl. No.: 10/185,385

(22) Filed: Jun. 28, 2002

(65) Prior Publication Data

US 2003/0112902 A1 Jun. 19, 2003

Related U.S. Application Data

(60) Provisional application No. 60/341,508, filed on Dec. 13, 2001.

(51) Int. Cl.
*H04B 7/10* (2006.01)
*H04L 1/02* (2006.01)

(52) U.S. Cl. .................. 375/347; 375/349; 375/267; 375/340

(58) Field of Classification Search ............... 375/225, 375/260, 267, 347, 349, 340
See application file for complete search history.

(56) References Cited

U.S. PATENT DOCUMENTS

| | | | | |
|---|---|---|---|---|
| 5,202,903 A | * | 4/1993 | Okanoue | 375/347 |
| 5,265,122 A | | 11/1993 | Rasky et al. | 375/100 |
| 5,701,333 A | * | 12/1997 | Okanoue et al. | 375/347 |
| 5,727,032 A | * | 3/1998 | Jamal et al. | 375/347 |
| 6,081,566 A | * | 6/2000 | Molnar et al. | 375/347 |
| 6,130,909 A | * | 10/2000 | Anvari et al. | 375/232 |
| 6,173,014 B1 | * | 1/2001 | Forssen et al. | 375/267 |
| 6,192,038 B1 | * | 2/2001 | Wallerius et al. | 370/328 |
| 6,515,978 B1 | * | 2/2003 | Buehrer et al. | 370/342 |
| 6,763,074 B1 | * | 7/2004 | Yang | 375/328 |
| 2003/0035404 A1 | * | 2/2003 | Ozluturk et al. | 370/342 |
| 2003/0081702 A1 | * | 5/2003 | Kubo et al. | 375/341 |
| 2003/0091656 A1 | * | 5/2003 | Buehrer et al. | 375/142 |

FOREIGN PATENT DOCUMENTS

| | | |
|---|---|---|
| EP | 0449327 A2 | 10/1991 |
| EP | 0457460 A2 | 11/1991 |
| EP | 0 945 989 A1 | 3/1998 |
| EP | 1 045 531 A2 | 4/2000 |
| EP | 1 059 787 A1 | 6/2000 |
| GB | 2355164 A | 4/2001 |
| WO | WO 01/58105 A1 | 8/2001 |

\* cited by examiner

*Primary Examiner*—Jean B Corrielus
(74) *Attorney, Agent, or Firm*—Larry Lieberchuk

(57) ABSTRACT

Bit level, rather than symbol level, diversity combining is employed within a wireless communications receiver. Channel estimates and bit metrics are separately computed for signals received by different antenna elements. Bit metrics are calculated by determining a least squares cumulative difference between all bits within the received symbol and corresponding bits within constellation symbols as modified by the channel estimate. The separately-determined bit metrics are then combined for decoding. Performance improvements over both single antenna systems and multiple antenna systems with symbol level diversity combining are achieved.

16 Claims, 7 Drawing Sheets

BIT LEVEL DIVERSITY COMBINING FOR COFDM SYSTEM

CROSS-REFERENCE TO RELATED APPLICATION

This application claims priority to U.S. Provisional Application No. 60/341,508 filed Dec. 13, 2001, the content of which is hereby incorporated by reference.

TECHNICAL FIELD OF THE INVENTION

The present invention is directed, in general, to wireless communications and, more specifically, to antenna diversity combining in reception of wireless communications.

BACKGROUND OF THE INVENTION

Currently available commercial wireless communications devices generally all utilize a single antenna for reception. Currently proposed wireless local area network (WLAN) standards, such as the Institute for Electrical and Electronic Engineers (IEEE) 802.11a and European Tele-communications Standards Institute (ETSI) High Performance European Radio Local Area Network version 2 (HiperLAN2) standards, suggest antenna switching and diversity combining techniques to overcome typical channel fading problems in wireless systems. The antenna switching techniques normally select a signal from among various antenna based on the criteria of signal amplitude, while diversity combining utilizes the signals from each antenna by applying different weights. At least in theory, diversity combining produces better results than switching systems.

However, all currently published proposals for diversity combining or beamforming for coded orthogonal frequency division multiplexing (COFDM) systems employ algorithms operating at the symbol level, which fails to take maximum advantage of the one of the most important benefits of COFDM signaling: that equalization is embedded in the decoding process.

There is, therefore, a need in the art for bit-level diversity combining for coded orthogonal frequency division multiplexing receivers.

SUMMARY OF THE INVENTION

To address the above-discussed deficiencies of the prior art, it is a primary object of the present invention to provide, for use in wireless communications receiver, use of bit level, rather than symbol level, diversity combining. Channel estimates and bit metrics are separately computed for signals received by different antenna elements. Bit metrics are calculated by determining a least squares cumulative difference between all bits within the received symbol and corresponding bits within constellation symbols as modified by the channel estimate. The separately-determined bit metrics are then combined for decoding. Performance improvements over both single antenna systems and multiple antenna systems with symbol level diversity combining are achieved.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 and 3 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
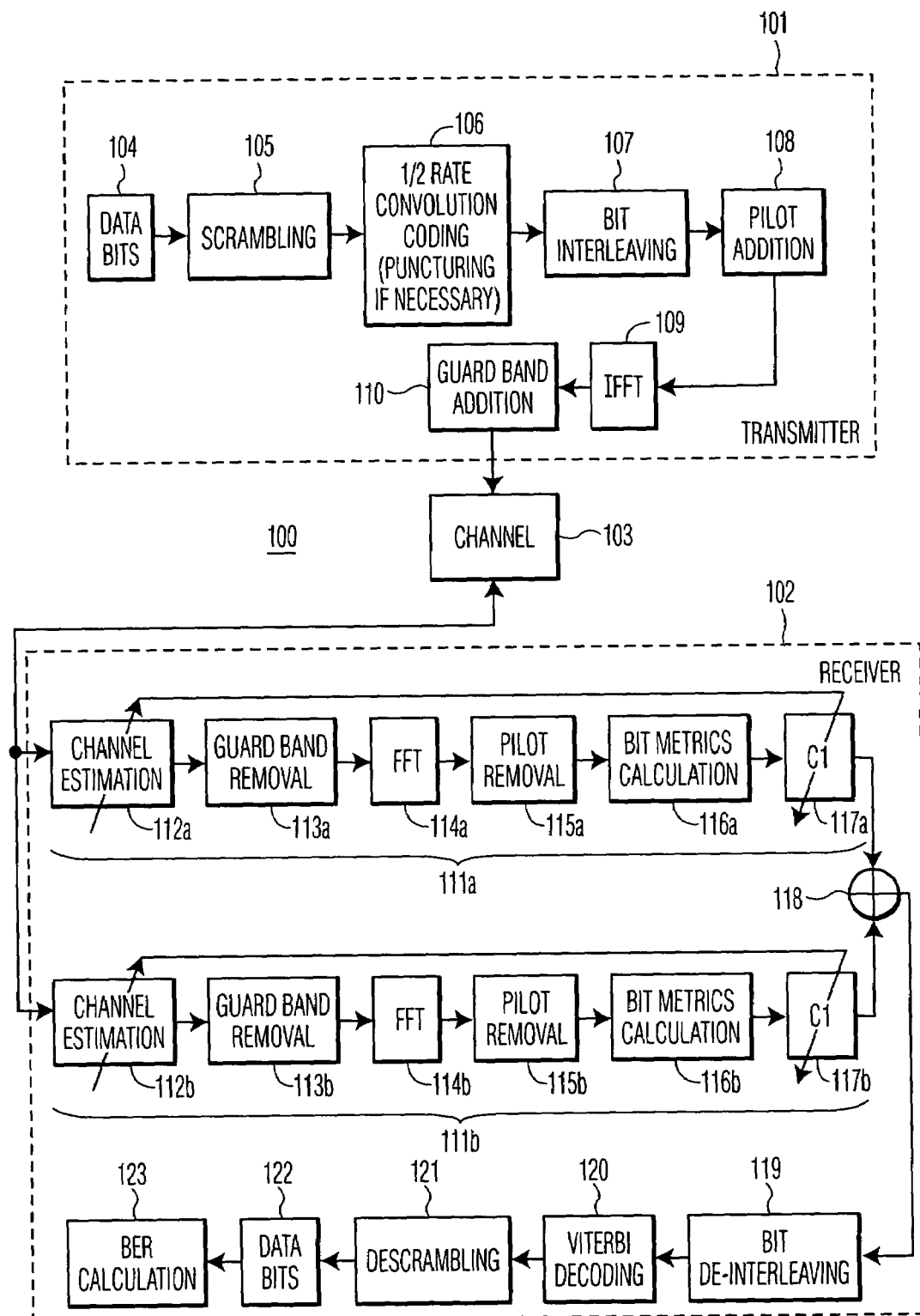
FIG. 1 depicts a wireless communications system employing bit-level diversity combining according to one embodiment of the present invention.

FIG. 1 depicts a wireless communications system employing bit-level diversity combining according to one embodiment of the present invention. Wireless communications system 100 includes a transmitter 101 and receiver 102 coupled by a wireless transmission channel 103. To achieve reliable high-speed transmission, the wireless transmission channel 103 should be stable with very little fading. While the presence of such a channel is assumed by the IEEE 802.11a and HiperLAN2 standards, in reality the wireless channel 103 has a very high probability of exhibiting Rayleigh fading, either temporal, frequency-selective, or both. High speed transmission under such conditions is very difficult to achieve without increasing the signal processing complexity on the receiver side.

In the exemplary embodiment, transmitter 101 includes a unit 104 for generating and/or buffering the data bits to be transmitted, serially connected to a scrambling unit 105, a convolution coder 106 (with optionally puncturing), a bit interleaving unit 107, a pilot addition unit 108, an inverse fast Fourier transform (IFFT) unit 109, and a guard band addition unit 110.

Transmitter 101 transmits the output of guard band addition unit 110 on wireless channel 103. Receiver 102 employs multiple antenna elements (not shown), with optional tuning to different frequencies, to improve reception in situations where the antenna elements do not experience fading at the same time or frequency.

Within receiver 102, separate processing paths 111a and 111b are maintained for the signals received on different antenna elements. Although only two paths (and corresponding antenna elements) are illustrated in the exemplary embodiment, any integer number of antenna elements and respective processing paths may be employed.

Each signal processing path 111a and 111b within receiver 102 includes a channel estimation unit 112a, 112b serially connected with a guard band removal unit 113a, 113b, a fast Fourier transform (FFT) unit 114a, 114b for converting the received time domain signal samples into the frequency domain, a pilot removal unit 115a, 115b, a bit metrics calculation unit 116a, 116b, and channel weighting units (C1 and C2) 117a, 117b.

Within signal processing paths 111a, 111b, bit metrics calculation units 116a and 116b utilize the characteristics of bit interleaving under COFDM standards to perform symbol to bit mapping before de-interleaving in the soft decoding by calculating the bit metrics according to the largest probability for each bit using the received symbol. The faded, noisy received version of the transmitted channel symbol is passed through bit metric computation units 116a and 116b, which calculate:

$$m_i^c(n) = -\min_{x \in S^c} \|y - hx\|^2, c = 0, 1 \quad (1)$$

where m is the metric for bit i in one symbol, y is the received symbol, h is the fading and noisy channel (based on the channel estimate), x is the original symbol constellation, and c represents the transmitted bits to be "0" or "1". In physical terms, equation (1) determines the shortest distance between the received symbol and projections of the constellation symbols in the channel.

The bit patterns determined by bit metrics computation units 116a and 116b are then weighted by weighting unit 117a and 117b and combined by signal adder 118 before being sent to bit de-interleaving unit 119 and Viterbi decoder 120, then to descrambling unit 121 for determination of the data bits stored and/or utilized in by unit 122 and employed for bit error rate (BER) calculation in unit 123.

Figure 2:
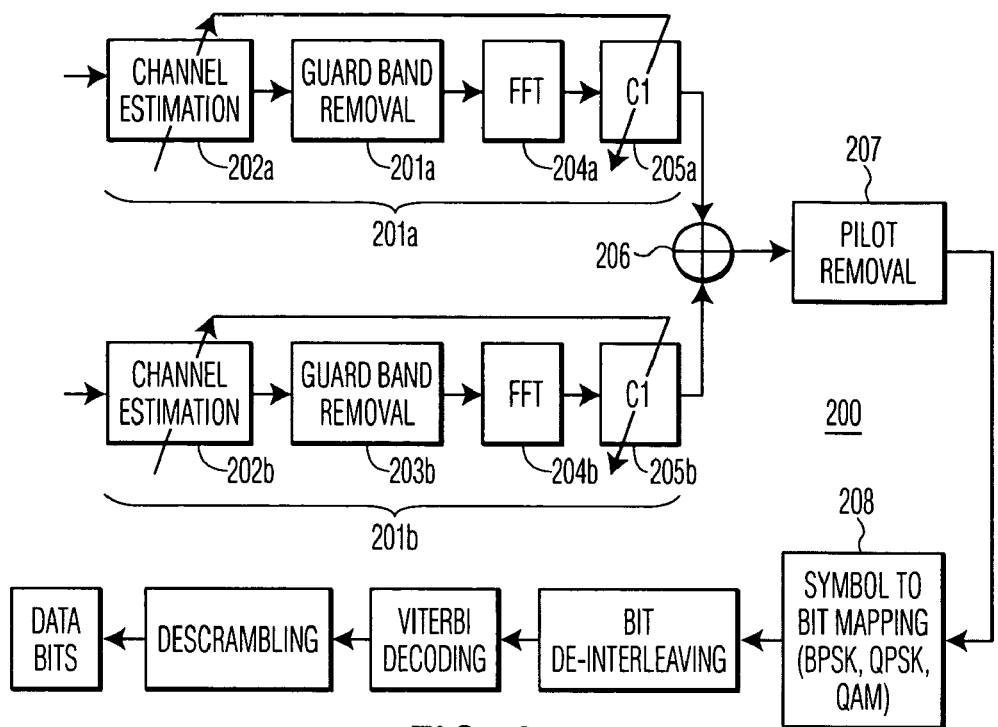
FIG. 2 is a comparative diagram of a portion of a possible wireless receiver employing symbol-level diversity combining.

FIG. 2 is a comparative diagram of a portion of a possible wireless receiver employing symbol-level diversity combining. With a symbol-level diversity combining system 200, the signals received by various antenna elements by separate processing paths 201a, 201b including units for channel estimation 202a, 202b, guard band removal 203a, 203b, fast Fourier transform 204a, 204b, and weighting 205a and 205b. However, signal adder 206 combines the processed signals at the symbol level prior to pilot removal 207 and symbol to bit mapping 208.

Figure 3:
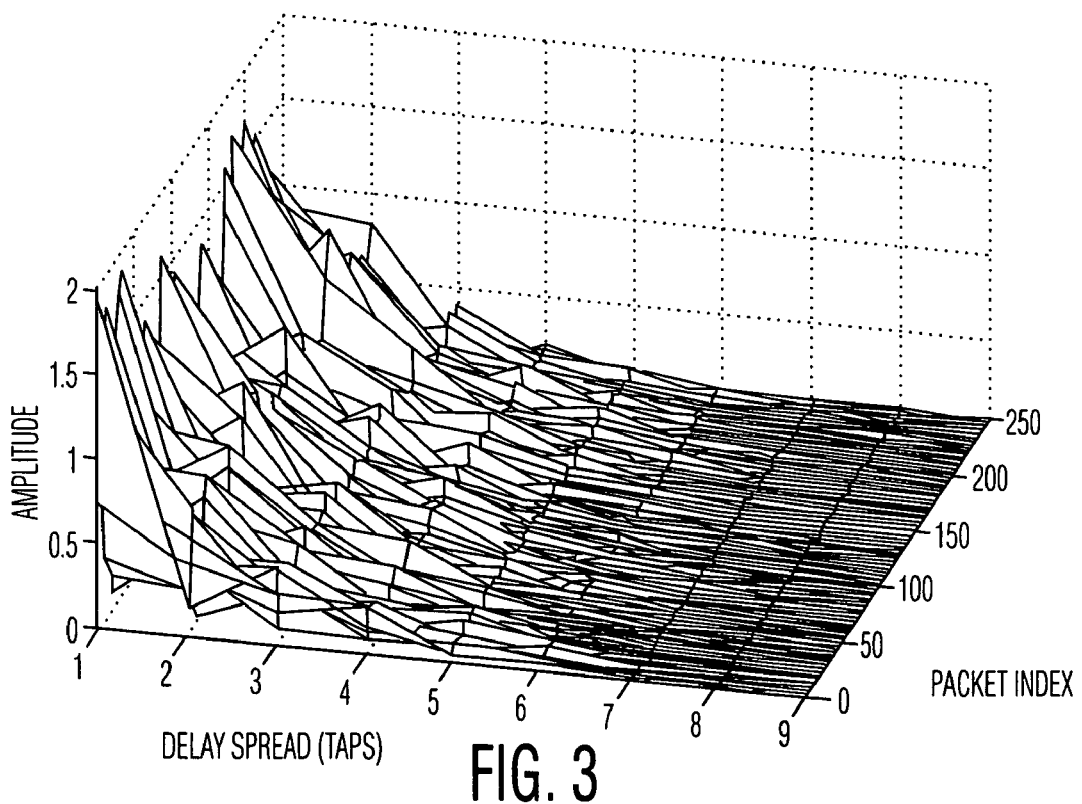
FIGS. 3, 4A–4D and 5A–5D illustrate a simulation input and comparative results for bit level diversity combining within a wireless receiver according to one embodiment of the present invention.

FIGS. 3, 4A–4D and 5A–5D illustrate a simulation input and comparative results for bit level diversity combining within a wireless receiver according to one embodiment of the present invention. Simulations for the purpose of comparing the performance of (1) single antenna versus dual antenna systems employing bit level diversity combining and (2) dual antenna system employing bit level rather than symbol level diversity combining were performed utilizing the roughly one million data bits grouped in 250 packets with 4096 bits in each packet. Multipath channel characteristics were assumed not to change during transmission of a given packet, while different packets could potentially experience different multipath channel characteristics. The amplitude for the channel during transmission of the packets is illustrated in FIG. 3.

Figure 4A:
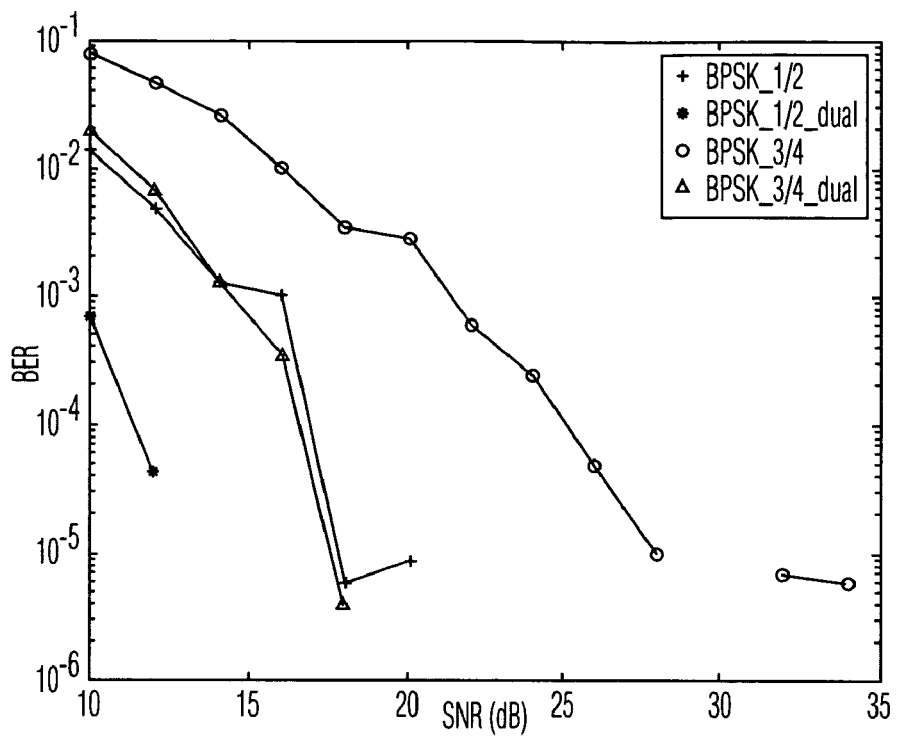
Figure 4B:
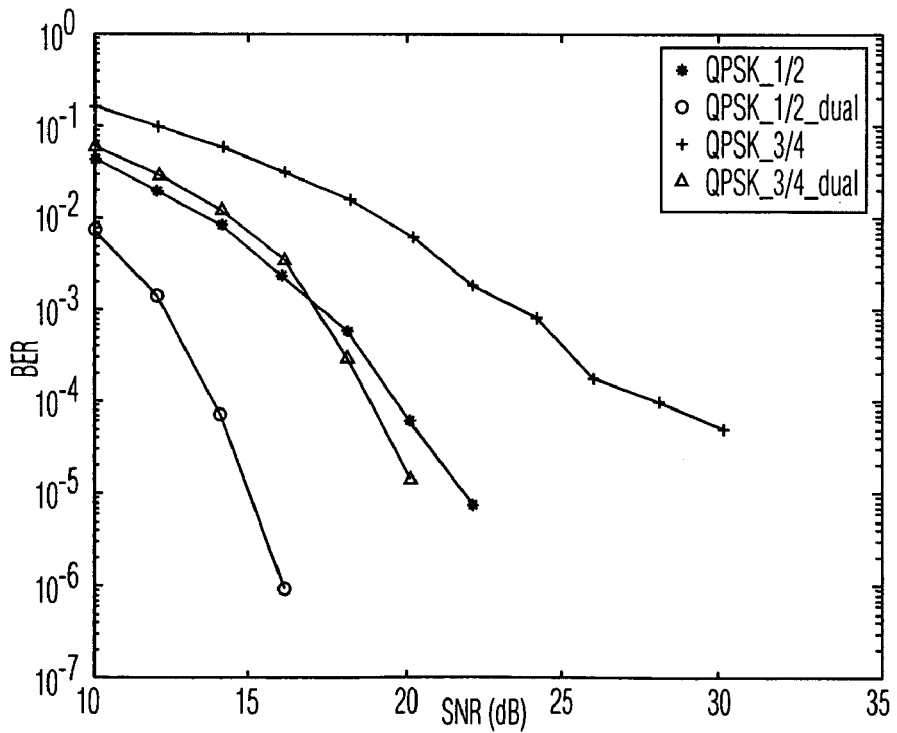
Figure 4C:
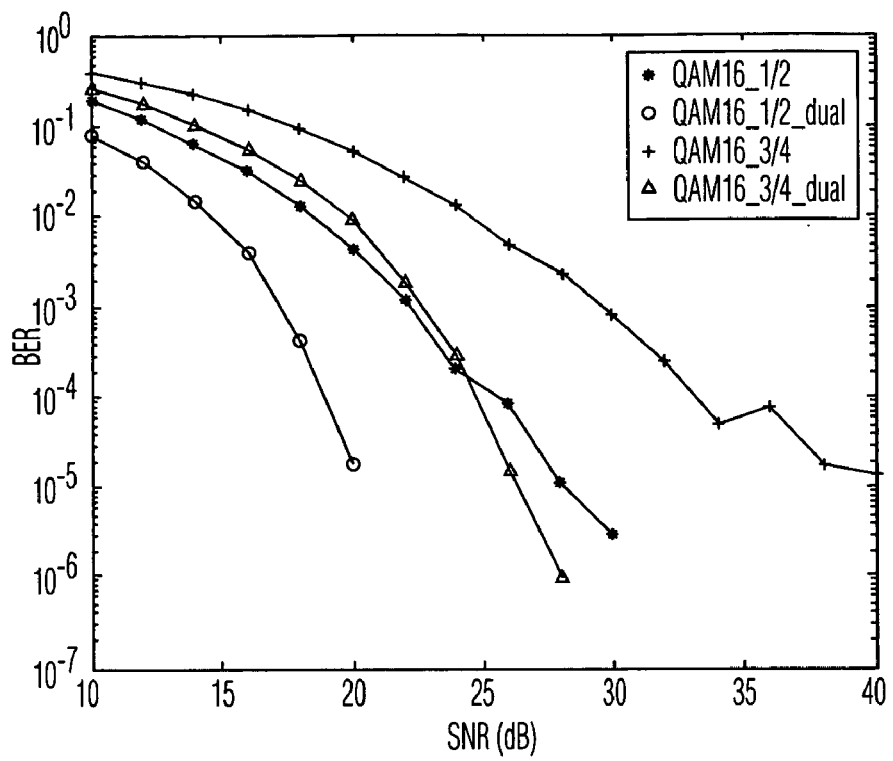
Figure 4D:
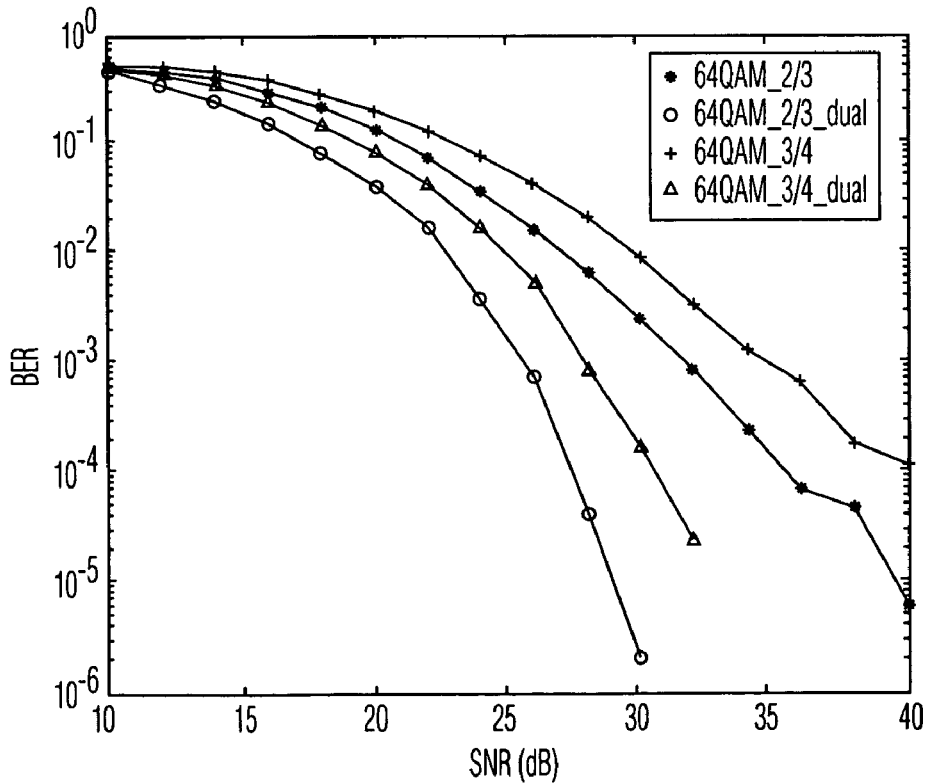

FIGS. 4A through 4D depict comparative simulation results for bit error rates (BER) as a function of signal to noise ratio (SNR) for various modulation techniques utilizing a single antenna system versus a dual antenna system with bit level diversity combining. FIG. 4A illustrates the results for rate 1/2 and rate 3/4 binary phase shift key (BPSK) modulation; FIG. 4B illustrates the results for rate 1/2 and rate 3/4 quadrature phase shift key (QPSK) modulation; FIG. 4C illustrates the results for rate 1/2 and rate 3/4 quadrature amplitude modulation with sixteen discrete levels (16-QAM); and FIG. 4D illustrates the results for rate 2/3 and rate 3/4 quadrature amplitude modulation with sixty-four discrete levels (64-QAM).

In the simulation results, the dual antenna system with bit level diversity combining exhibits a substantial performance gain—about 4–6 decibels (dB) better—over the single antenna system. The performance gap between single antenna and dual antenna with bit level diversity combining increases with the signal to noise ratio since better channel estimation is provided by the dual antenna system at higher signal to noise rations.

Figure 5A:
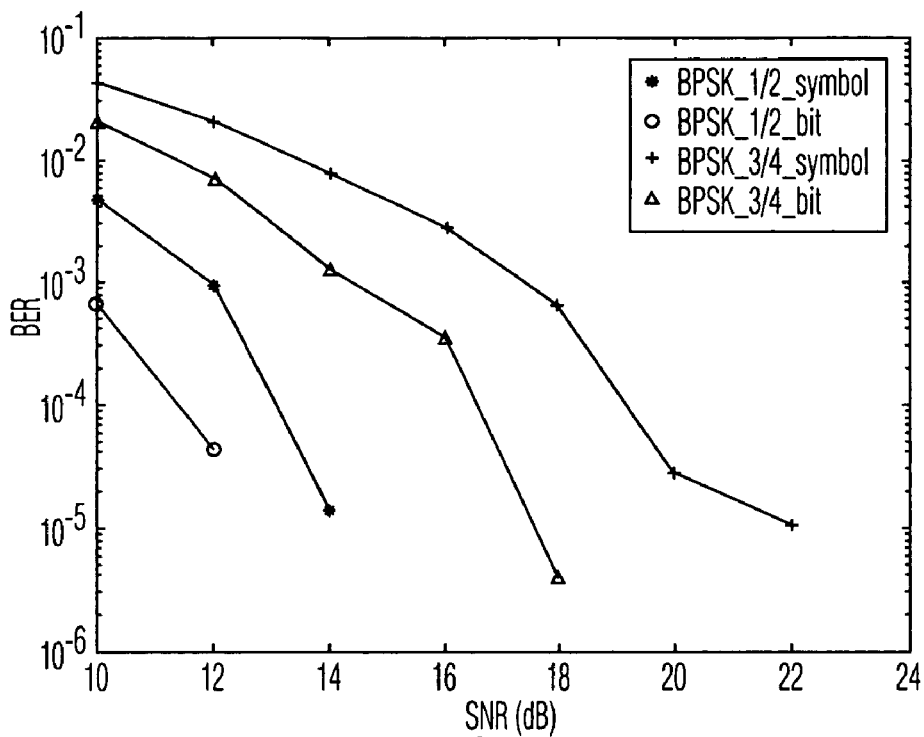
Figure 5B:
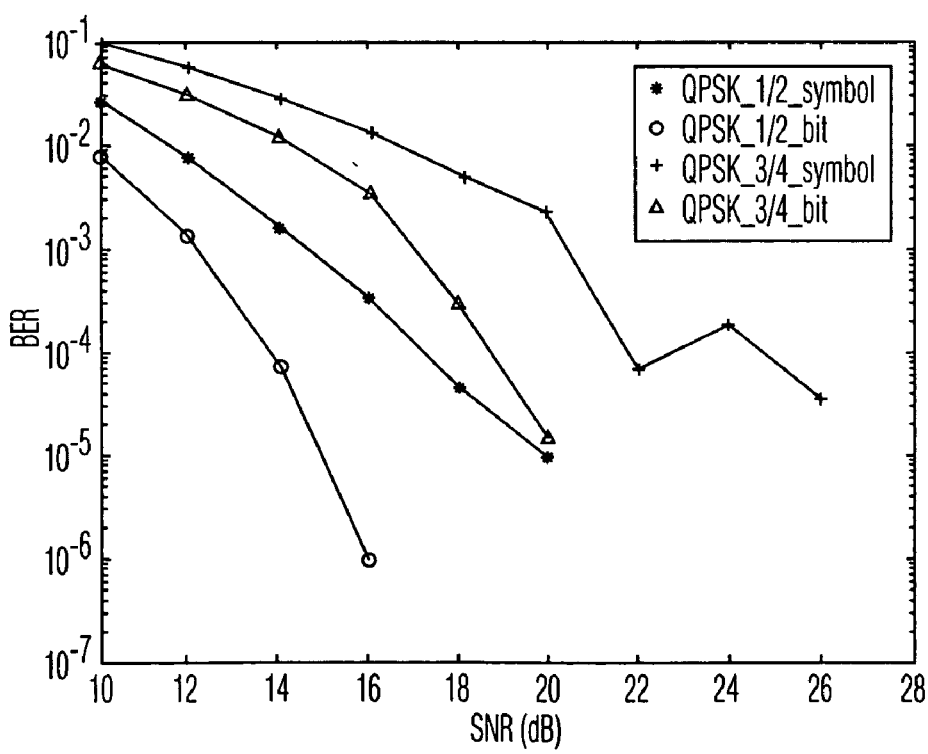
Figure 5C:
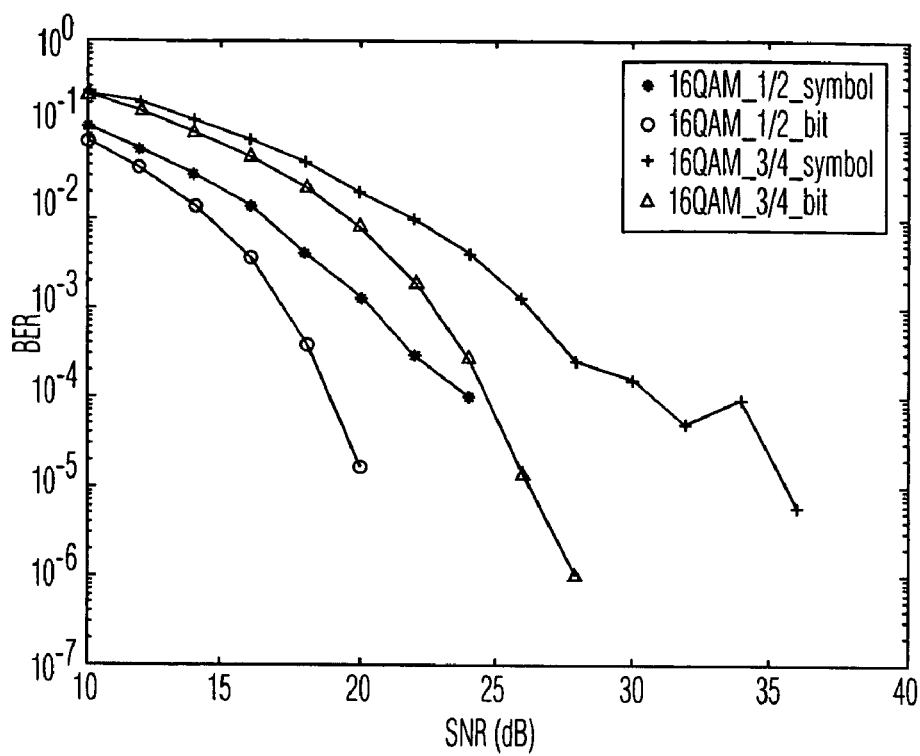
Figure 5D:
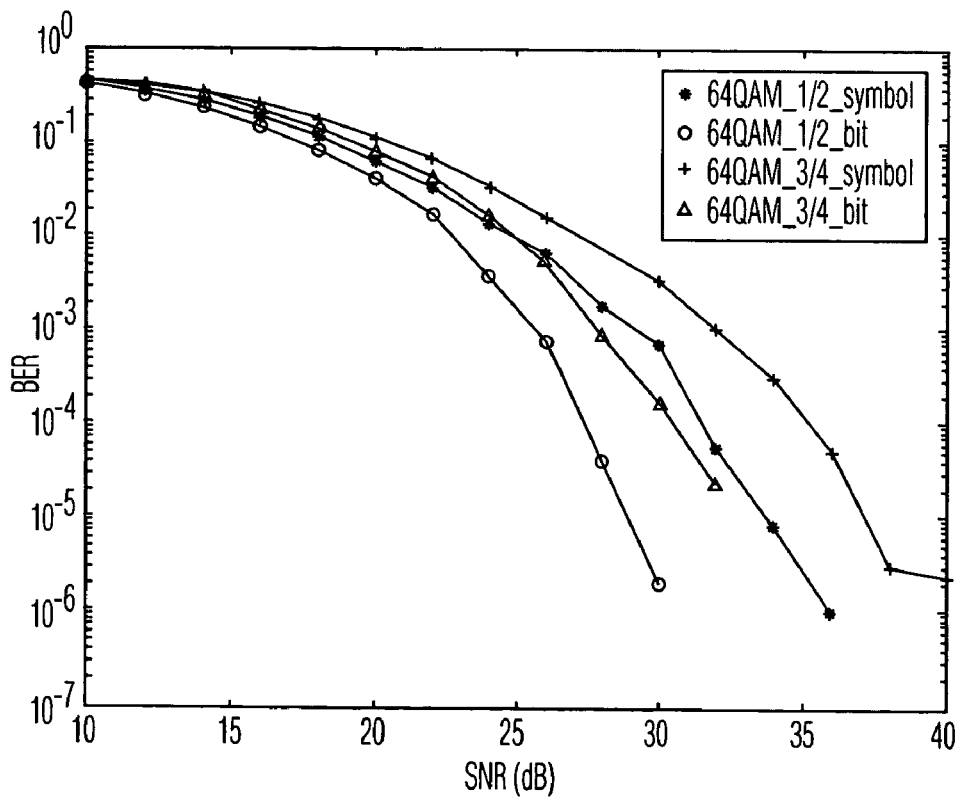

FIGS. 5A through 5D depict comparative simulation results for BER as a function of SNR for various modulation techniques utilizing dual antenna systems, one employing symbol level diversity combining and one employing bit level diversity combining. FIG. 5A illustrates the results for rate 1/2 and rate 3/4 BPSK modulation; FIG. 5B illustrates the results for rate 1/2 and rate 3/4 QPSK modulation; FIG. 5C illustrates the results for rate 1/2 and rate 3/4 16-QAM; and FIG. 5D illustrates the results for rate 2/3 and rate 3/4 64-QAM. The bit level diversity combining system has a significantly better performance—about 2–5 dB better—than the symbol level diversity combining system.

Figure 6:
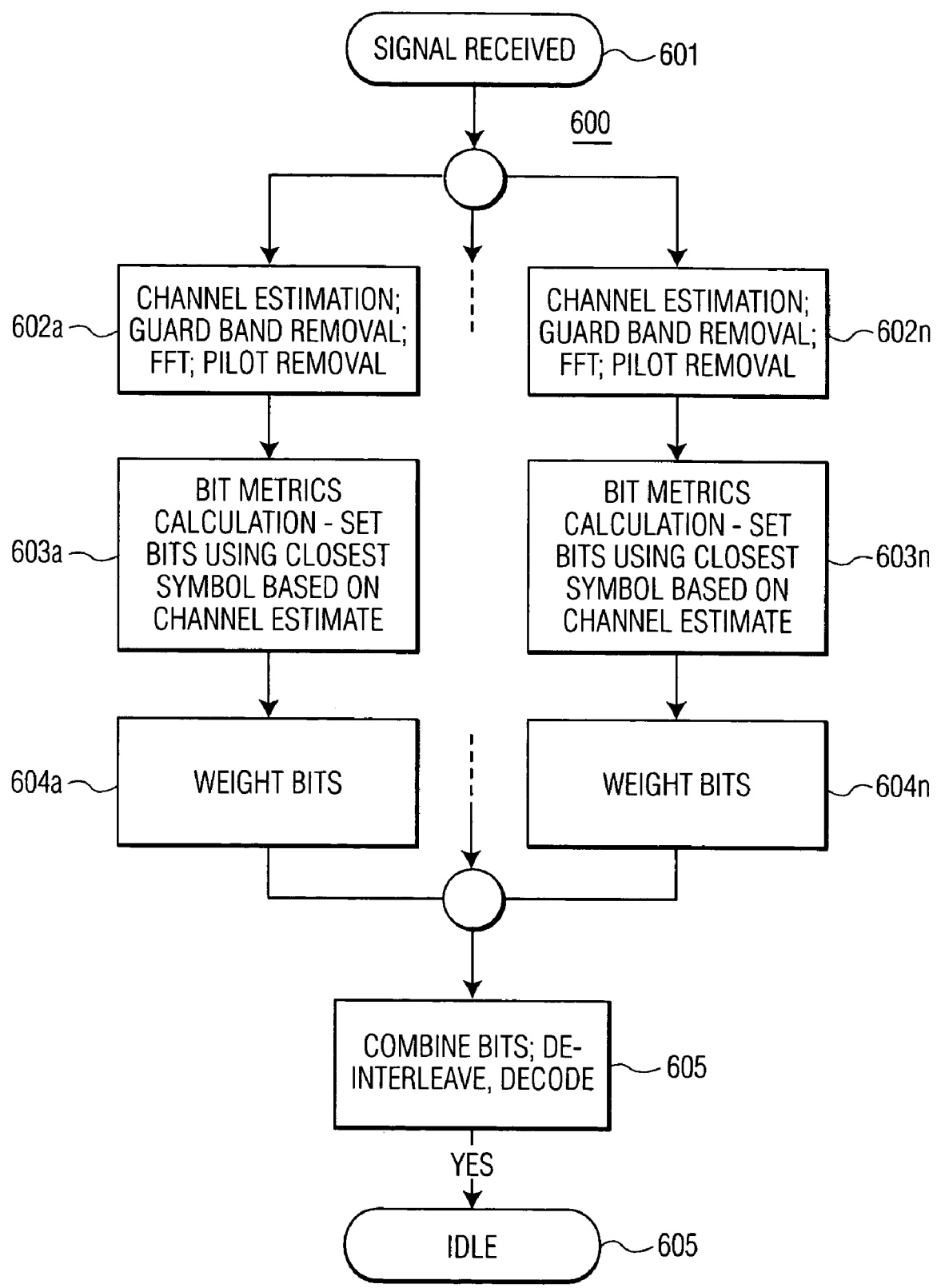
FIG. 6 is a high level flow chart for a process of bit level diversity combining according to one embodiment of the present invention.

FIG. 6 is a high level flow chart for a process of bit level diversity combining according to one embodiment of the present invention. The process 600 begins with a signal being received at n antenna elements (step 601), where n is any positive non-zero integer. The received signals at each antenna element are separately and concurrently processed for channel estimation, guard band removal, Fourier transform, and pilot removal (steps 602a–602n). Bit metrics are then independently calculated for each stream by determining, for all bits within a particular symbol, a least squares difference between bits of the received symbol and bits for each constellation symbol after modification with the channel estimate (steps 603*a*–603*n*). The bits or symbols are then optionally weighted (steps 604*a*–604*n*) and combined, deinterleaved, and decoded (step 605). The process then becomes idle (step 606) until additional wireless signals are received.

The unique interleaving and coding characteristics of COFDM systems are considered and exploited in the present invention by employing bit level diversity combining together with combined equalization and decoding within a single wireless receiver stage. Channel estimation and bit metrics calculation for soft Viterbi decoding are performed separately for each antenna element, which experience different channel characteristics. The separate bit metrics are then combined prior to be sent to the Viterbi decoder, producing a performance improvement over both single antenna systems and dual antenna systems utilizing symbol level diversity combining.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A wireless receiver comprising:
  for each of a plurality of antenna elements employed to receive a wireless signal, separate channel estimation units and bit metric calculation units, wherein each bit metric calculation unit determines bits for each received symbol from a corresponding antenna element based on a corresponding channel estimate, and wherein each of the bit metric calculation units determines, for all bits within a received symbol, a cumulative least squares difference between the bits within the received symbol and counterpart bits within constellation symbols modified by the corresponding channel estimate;
  a signal combiner combining outputs of the separate bit metric calculation units; and
  a decoder receiving and operating on an output of the signal combiner.

2. The wireless receiver according to claim 1, wherein each of the bit metric calculation units determines a shortest distance between each received symbol and projected constellation symbols within a channel for the corresponding antenna element.

3. The wireless receiver according to claim 1, wherein each of the bit metric calculation units selectively sets bits within each received symbol to a logical one or a logical zero based upon the cumulative least squares difference.

4. The wireless receiver according to claim 1, wherein the received wireless signal is modulated by coded orthogonal frequency division multiplexing.

5. A wireless communications system comprising:
  a transmitter;
  a channel by which a wireless signal from the transmitter is transmitted; and
  a receiver receiving the wireless signal from the channel, wherein the receiver comprises:
    for each of a plurality of antenna elements employed to receive the wireless signal, separate channel estimation units and bit metric calculation units, wherein each bit metric calculation unit determines bits for each received symbol from a corresponding antenna element based on a corresponding channel estimate, and wherein each of the bit metric calculation units determines, for all bits within a received symbol, a cumulative least squares difference between the bits within the received symbol and counterpart bits within constellation symbols modified by the corresponding channel estimate;
    a signal combiner combining outputs of the separate bit metric calculation units; and
    a decoder receiving and operating on an output of the signal combiner.

6. The wireless communications system according to claim 5, wherein each of the bit metric calculation units determines a shortest distance between each received symbol and projected constellation symbols within a channel for the corresponding antenna element.

7. The wireless communications system according to claim 5, wherein each of the bit metric calculation units selectively sets bits within each received symbol to a logical one or a logical zero based upon the cumulative least squares difference.

8. The wireless communications system according to claim 5, wherein the wireless signal is modulated by coded orthogonal frequency division multiplexing.

9. A method of receiving a wireless signal, comprising:
  for each of a plurality of antenna elements employed to receive the wireless signal, separately estimating a corresponding channel estimate and providing bit metric calculation, wherein each of the bit metric calculations determines bits for each received symbol from a corresponding antenna element based on the corresponding channel estimate, and wherein each of the bit metric calculations determines, for all bits within a received symbol, a cumulative least squares difference between the bits within the received symbol and counterpart bits within constellation symbols modified by the corresponding channel estimate;
  combining the bit metric calculations to generate a combined output; and
  decoding the combined output.

10. The method according to claim 9, wherein each of the bit metric calculations further comprises:
  determining a shortest distance between each received symbol and projected constellation symbols within a channel for the corresponding antenna element.

11. The method according to claim 9, wherein each of the bit metric calculations further comprises:
  selectively setting bits within each received symbol to a logical one or a logical zero based upon the cumulative least squares difference.

12. The method according to claim 9, further comprising:
  demodulating the received wireless signal using coded orthogonal frequency division multiplexing.

13. A method for partially processing a wireless signal, comprising:
- providing separate bit metrics for each of a plurality of antenna elements to receive the wireless signal, wherein each bit metric is derived from bits for each received symbol from a corresponding antenna element based on a corresponding channel estimate for the antenna element; and
- determining, for all bits within a received symbol, a cumulative least squares difference between the bits within the received symbol and counterpart bits within constellation symbols modified by the corresponding channel estimate.

14. The method according to claim 13, wherein the bit metrics are determined from a shortest distance between each received symbol and projected constellation symbols within a channel for the corresponding antenna element.

15. The method according to claim 13, wherein the bits within the received symbol are selectively set to a logical one or a logical zero based upon the cumulative least squares difference.

16. The method according to claim 13, wherein the bit metrics correspond to the wireless signal modulated by coded orthogonal frequency division multiplexing.

* * * * *